(12) United States Patent
Kiyokami

(10) Patent No.: US 11,993,194 B2
(45) Date of Patent: May 28, 2024

(54) DELIVERY VEHICLE

(71) Applicant: TOYOTA JIDOSHA KABUSHIKI KAISHA, Aichi-ken (JP)

(72) Inventor: Hiroaki Kiyokami, Nisshin (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 345 days.

(21) Appl. No.: 17/411,058

(22) Filed: Aug. 25, 2021

(65) Prior Publication Data

US 2022/0097591 A1 Mar. 31, 2022

(30) Foreign Application Priority Data

Sep. 29, 2020 (JP) ................................. 2020-164009

(51) Int. Cl.
*B60P 3/00* (2006.01)
*B60J 7/04* (2006.01)

(52) U.S. Cl.
CPC .............. *B60P 3/007* (2013.01); *B60J 7/041* (2013.01)

(58) Field of Classification Search
CPC .. B60P 3/007; B60P 3/00; B60P 3/055; G06Q 10/083; G06Q 10/0832; G06Q 10/08355; B60J 7/041; B65G 65/00; B65G 1/10; B65G 1/12; B65G 47/53; B65G 61/10
See application file for complete search history.

(56) References Cited

U.S. PATENT DOCUMENTS

| | | | | |
|---|---|---|---|---|
| 11,447,055 B2 * | 9/2022 | Kanitz | .................. | B25J 19/023 |
| 2017/0225601 A1 * | 8/2017 | Borders | ............... | B60P 1/6418 |
| 2017/0225902 A1 * | 8/2017 | Harper | ................. | G06Q 10/087 |
| 2017/0357919 A1 * | 12/2017 | Bischoff | .................. | B07C 3/08 |
| 2022/0097970 A1 * | 3/2022 | Kiyokami | ............ | G06Q 10/083 |
| 2022/0348427 A1 * | 11/2022 | Bell | ........................ | B62D 33/02 |

FOREIGN PATENT DOCUMENTS

| | | |
|---|---|---|
| CN | 107696944 A | 2/2018 |
| JP | S60042133 A | 3/1985 |
| JP | 5796300 B2 | 10/2015 |
| JP | 201999279 A | 6/2019 |
| JP | 202090151 A | 6/2020 |

* cited by examiner

*Primary Examiner* — James A English
(74) *Attorney, Agent, or Firm* — HAUPTMAN HAM, LLP

(57) ABSTRACT

A delivery vehicle includes a vehicle body, a first opening that is provided at the vehicle body and that places a cabin interior and a cabin exterior in communication with each other, a second opening that is provided at the vehicle body at a different position from the first opening, and that places the cabin interior and the cabin exterior in communication with each other, a housing unit that is configured to accommodate a package in the cabin interior, that has one end disposed at a side corresponding to the first opening, and that has another end positioned further toward a vehicle lower side than the one end such that the housing unit is inclined in a vehicle downward direction from the one end toward the other end, and a transfer unit configured to transfer the package between the housing unit and the second opening.

4 Claims, 8 Drawing Sheets

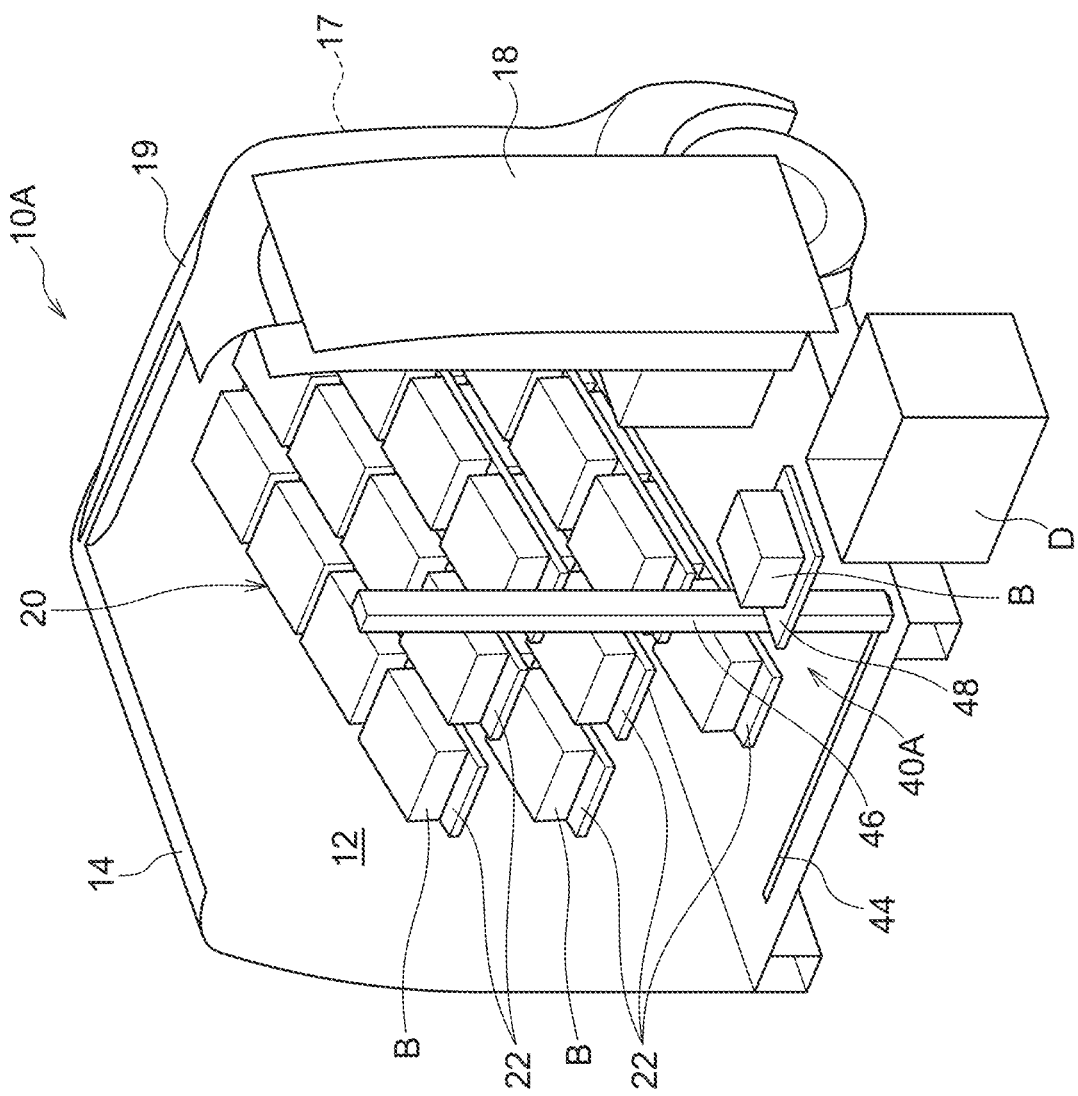
FIG.6
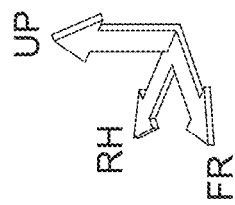

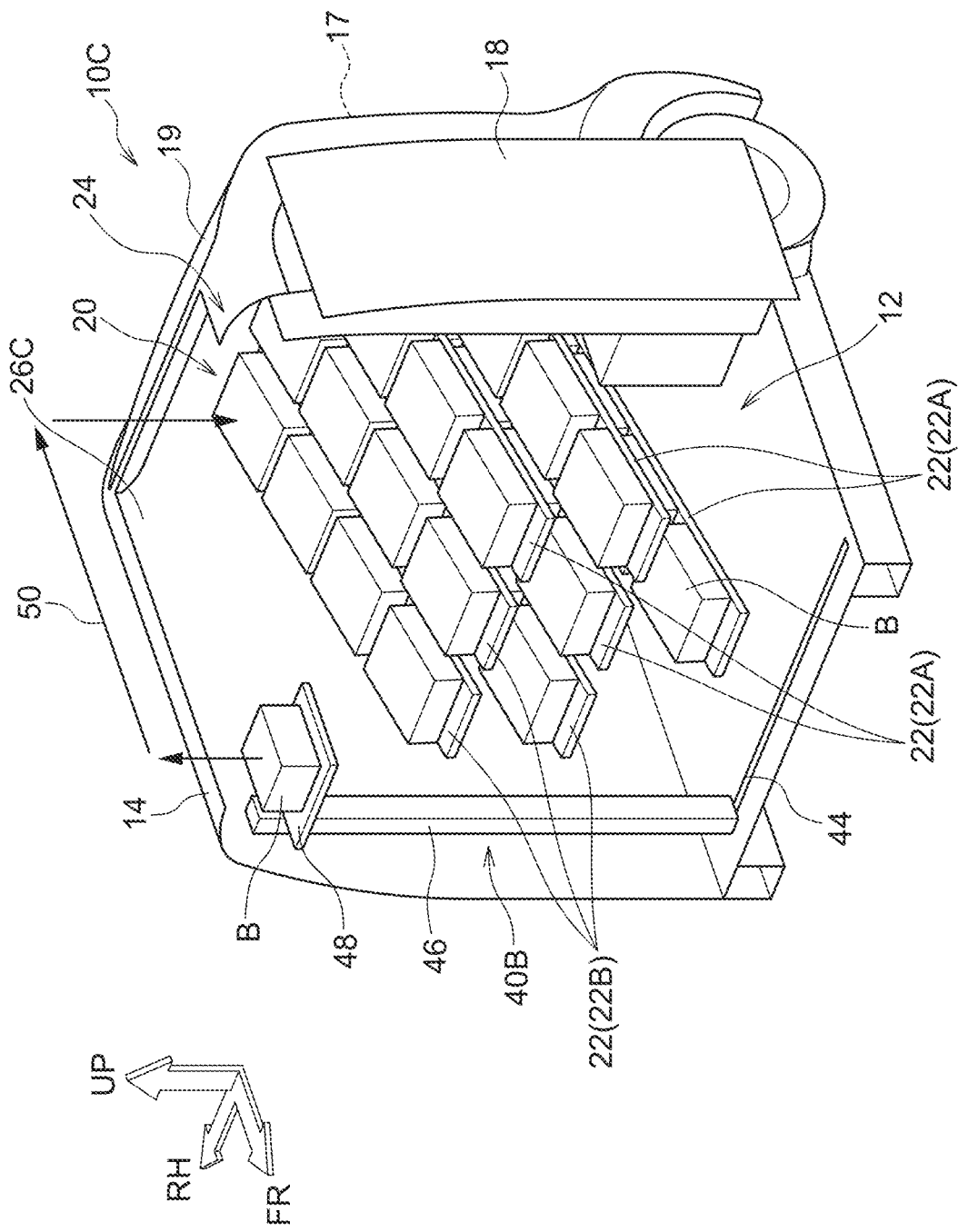

DELIVERY VEHICLE

CROSS-REFERENCE TO RELATED APPLICATION

This application is based on and claims priority under 35 USC 119 from Japanese Patent Application No. 2020-164009 filed on Sep. 29, 2020, the disclosure of which is incorporated by reference herein.

BACKGROUND

Technical Field

The present disclosure relates to a delivery vehicle.

Related Art

For example, Japanese Patent Application Laid-Open (JP-A) No. 2020-90151 discloses a delivery system in which a robot arm is used to stow a package that has been loaded onto a conveyor provided inside a vehicle cabin in a housing compartment of a mobile robot.

In the delivery system disclosed in JP-A No. 2020-90151, the conveyor requires motive force, and needs to be installed across the entirety of a package loading area inside the vehicle cabin in order to pass the package to the robot arm. There is therefore room for improvement from the perspective of reducing costs. Further improvements to operating efficiency when loading on packages in such delivery vehicles would also be desirable.

The present disclosure provides a delivery vehicle that is capable of reducing costs and also improving operating efficiency.

A delivery vehicle of a first aspect includes a vehicle body, a first opening that is provided at the vehicle body and that places a cabin interior and a cabin exterior in communication with each other, a second opening that is provided at the vehicle body at a different position from the first opening, and that places the cabin interior and the cabin exterior in communication with each other, a housing unit that is configured to accommodate a package in the cabin interior, that has one end disposed at a side corresponding to the first opening, and that has another end positioned further toward a vehicle lower side than the one end such that the housing unit is inclined in a vehicle downward direction from the one end toward the other end, and a transfer unit configured to transfer the package between the housing unit and the second opening.

The delivery vehicle of the first aspect includes the housing unit that is configured to accommodate a package in the cabin interio, that includes the one end disposed at the side corresponding to the first opening, and that includes the other end positioned further toward the vehicle lower side than the one end such that the housing unit is inclined in the vehicle downward direction from the one end toward the other end. The delivery vehicle further includes the transfer unit configured to transfer the package between the housing unit and the second opening.

This enables the package to be moved from the first opening to the transfer unit via the housing unit. The package can thus be moved as far as the transfer unit without employing a conveyor requiring motive force, thereby enabling costs to be reduced. Moreover, the package can be moved as far as the transfer unit simply by loading the package on at the one end side of the transfer unit, such that worker operating efficiency is improved.

A delivery vehicle of a second aspect is the delivery vehicle of the first aspect, wherein the first opening is provided at a rear end section of the vehicle body, and the second opening is provided at least one of two side sections of the vehicle body.

In the delivery vehicle of the second aspect, the first opening is provided at the rear end section of the vehicle body, and the second opening is provided at at least one of the two side sections of the vehicle body. This enables the package to be placed on board from the vehicle rear, and enables the package to be carried away from a side of the vehicle. This enables a pathway for loading on the package and a pathway for unloading the package to be separated, thereby improving operating efficiency.

A delivery vehicle of a third aspect is the delivery vehicle of the first aspect, wherein the second opening is provided at a roof section of the vehicle body.

In the delivery vehicle of the third aspect, the second opening is provided at the roof section of the vehicle body. This enables the package to be transferred through the second opening provided in the roof section in cases in which, for example, a drone is employed to perform deliveries, thereby improving operating efficiency.

A delivery vehicle of a fourth aspect is the delivery vehicle of the first aspect of the second aspect, further including a third opening that is provided at the vehicle body at a different position from the first opening and the second opening, and that places the cabin interior and the cabin exterior in communication with each other In the delivery vehicle of the fourth aspect, the third opening is provided at a different position from the first opening and the second opening, thereby increasing the number of conveyance pathways for the package, and thus further improving operating efficiency.

A delivery vehicle of a fifth aspect is the delivery vehicle of the fourth aspect, wherein the transfer unit is further configured to transfer the package between the housing unit and the third opening.

In the delivery vehicle of the fifth aspect, the transfer unit is capable of transferring the package both between the housing unit and the second opening, and between the housing unit and the third opening. Since there are two pathways for unloading the package, the operating efficiency when unloading packages is improved.

A delivery vehicle of a sixth aspect is the delivery vehicle of the fourth aspect or the fifth aspect, wherein the third opening is provided at a roof section of the vehicle body.

In the delivery vehicle of the sixth aspect, the third opening is provided at the roof section of the vehicle body. This enables the package to be transferred through the third opening provided in the roof section in cases in which, for example, a drone is employed to perform deliveries, thereby improving operating efficiency.

A delivery vehicle of a seventh aspect is the delivery vehicle of the sixth aspect, further including a cargo handling section configured to carry the package from the third opening to the one end side of the housing unit.

The delivery vehicle of the seventh aspect is provided with the cargo handling section configured to carry the package from the third opening to the one end side, namely an upstream side, of the housing unit, thereby enabling a package that has been extracted through the third opening provided in the roof section of the vehicle to be housed in the housing unit by the cargo handling section. This for example enables an operation to be performed to rearrange the packages housed in the housing unit.

As described above, the delivery vehicle of the first aspect is capable of moving the package as far as the transfer unit without employing a conveyor requiring motive force, and thereby exhibits the excellent advantageous effect of enabling costs to be reduced. Moreover, since the package can be moved as far as the transfer unit simply by loading the package on at the one end side of the housing unit, worker operating efficiency is also improved.

The delivery vehicle of the second aspect is capable of separating the pathway for loading on the package from the pathway for unloading the package, thereby improving operating efficiency.

The delivery vehicle of the third aspect is capable of transferring the package through the second opening provided in the roof section in cases in which, for example, a drone is employed to perform deliveries, thereby improving operating efficiency.

The delivery vehicle of the fourth aspect increases the number of conveyance pathways for the package, thereby further improving operating efficiency.

The delivery vehicle of the fifth aspect employs two pathways for unloading the package, thereby improving operating efficiency when unloading packages.

The delivery vehicle of the sixth aspect is capable of transferring the package through the third opening provided in the roof section in cases in which, for example, a drone is employed to perform deliveries, thereby improving operating efficiency.

The delivery vehicle of the seventh aspect enables an operation to be performed to rearrange the packages housed in the housing unit.

BRIEF DESCRIPTION OF DRAWINGS

Exemplary embodiments of the present invention will be described in detail based on the following figures, wherein:

FIG. 6 is a cross-section perspective view sectioned along line F-F in FIG. 5, as viewed from the front left side;

FIG. 8 is a cross-section perspective view illustrating a vehicle according to a fourth exemplary embodiment as viewed from the front left side, with an upper side of the vehicle partially cut away.

DETAILED DESCRIPTION

First Exemplary Embodiment

Figure 1:
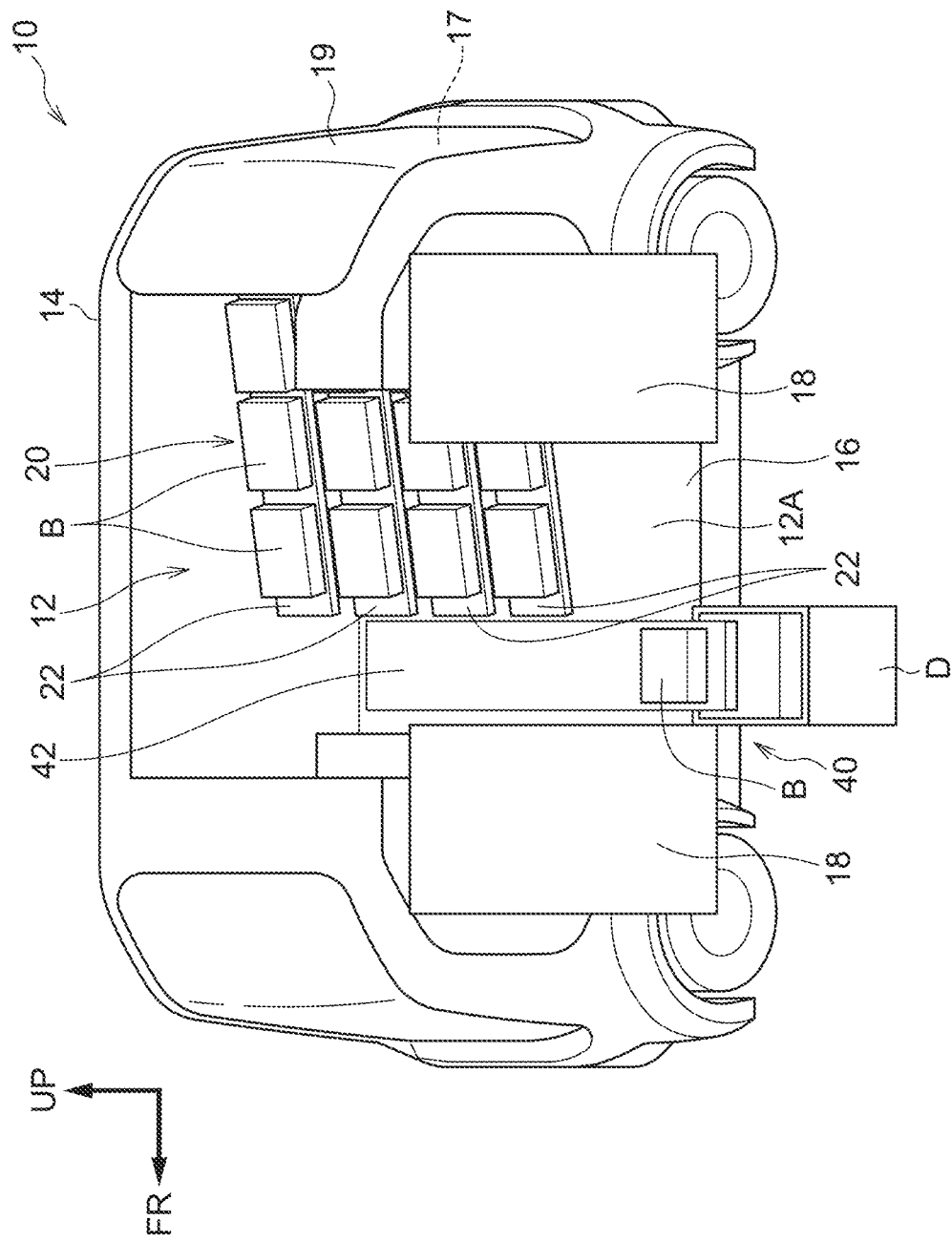
FIG. 1 is a perspective view illustrating a vehicle according to a first exemplary embodiment as viewed from an upper left side, with an upper side of the vehicle partially cut away.
Figure 2:
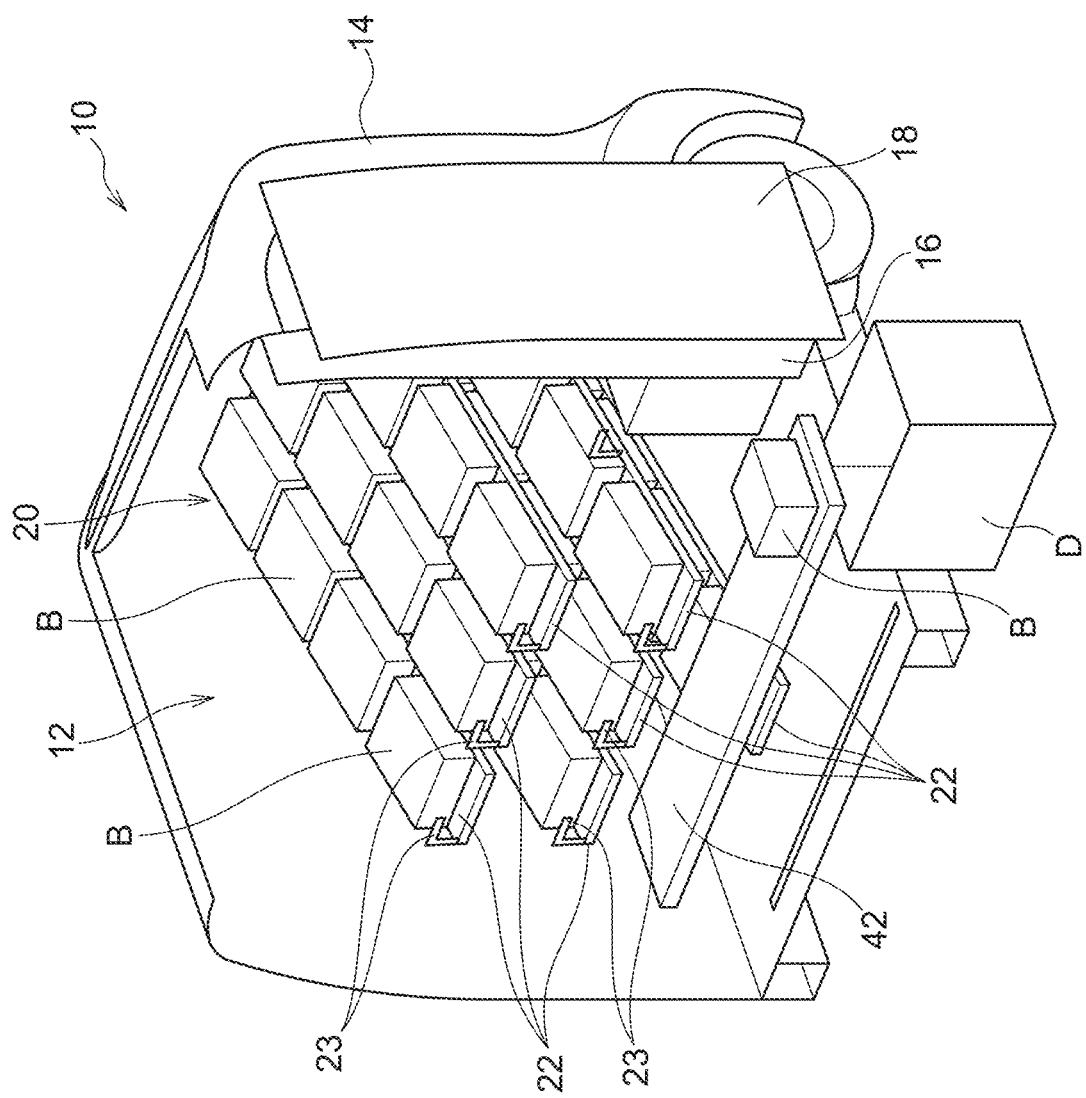
FIG. 2 is a perspective view illustrating a vehicle according to the first exemplary embodiment as viewed from a front left side, with a front side and an upper side of the vehicle partially cut away.
Figure 3:
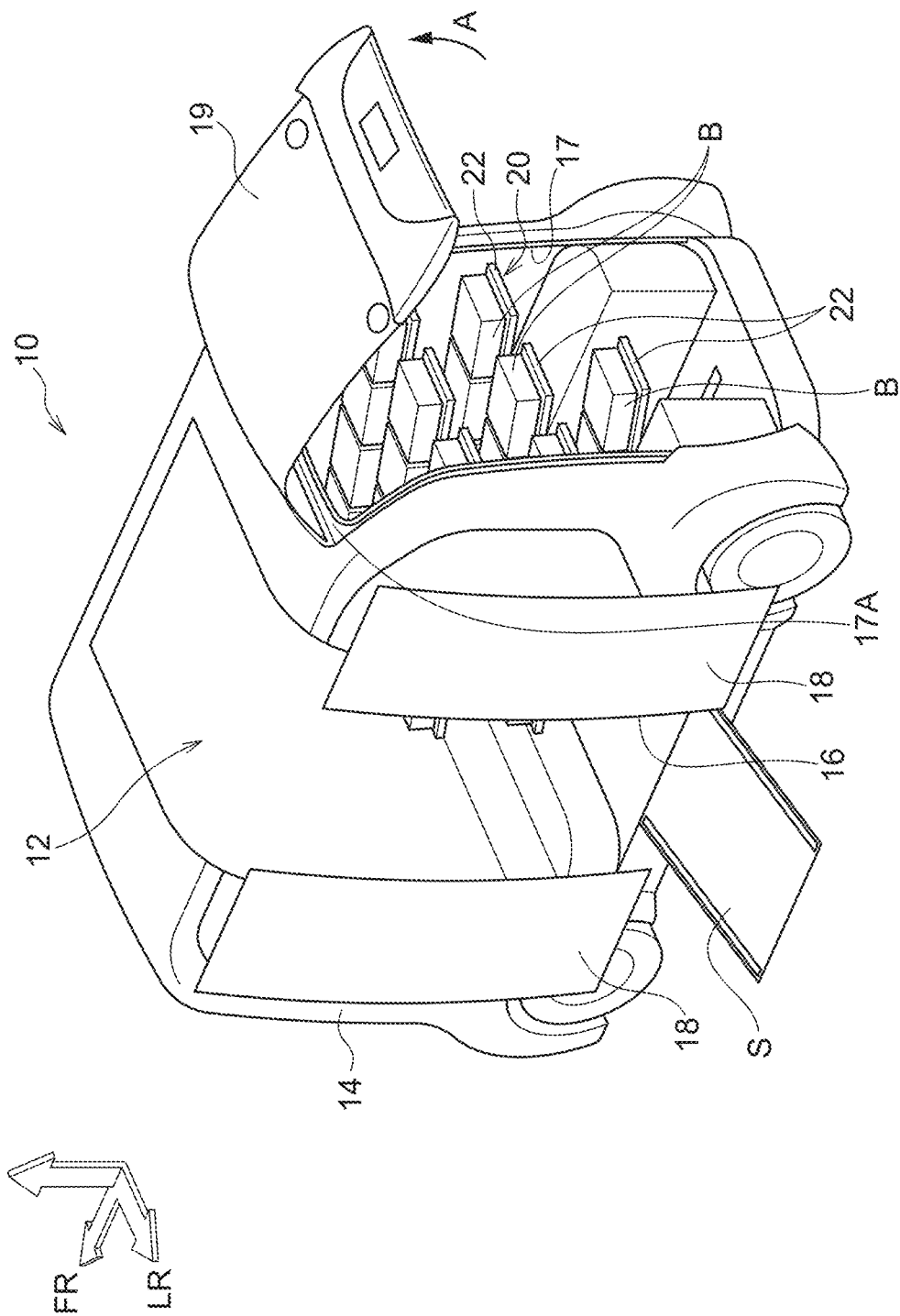
FIG. 3 is a perspective view of a vehicle according to the first exemplary embodiment as viewed from a rear left side, with an upper side of the vehicle partially cut away.

Explanation follows regarding a vehicle 10 according to a first exemplary embodiment of the present disclosure, with reference to FIG. 1 to FIG. 3. Note that in the drawings, the arrow FR indicates a vehicle front side, the arrow UP indicates a vehicle upper side, and the arrow RH indicates a vehicle width direction right side.

Vehicle

FIG. 1 is a perspective view illustrating the vehicle 10 according to the first exemplary embodiment as viewed from an upper left side, with an upper side of the vehicle 10 partially cut away. FIG. 2 is a perspective view illustrating the vehicle 10 as viewed from a front left side, with a front side and an upper side of the vehicle 10 partially cut away. FIG. 3 is a perspective view of the vehicle 10 as viewed from a rear left side, with the upper side of the vehicle 10 partially cut away. Note that the vehicle 10 is a delivery vehicle for conveying packages B.

As illustrated in FIG. 1 to FIG. 3, the vehicle 10 includes a substantially box shaped vehicle body 14 formed with an interior cabin 12. A side door opening 16 is formed in a vehicle width direction left side section of the vehicle body 14. The side door opening 16 places the interior and the exterior of the cabin 12 in communication with each other, and is capable of being opened and closed by a front and rear pair of sliding doors 18 that are capable of sliding along a vehicle front-rear direction. The sliding doors 18 are capable of being opened and closed manually, and also capable of being opened and automatically by a non-illustrated movement mechanism. When the sliding doors 18 are in an open state, the packages B can be passed between the interior and exterior of the cabin 12 through the side door opening 16. As illustrated in FIG. 3, a ramp S that facilitates entry and exit of a worker and a cart or the like in order to carry the packages B can be attached to the side door opening 16.

As illustrated in FIG. 1 and FIG. 3, a back door opening 17 is formed at a rear end section of the vehicle body 14. The back door opening 17 places the interior and the exterior of the cabin 12 in communication with each other, and is capable of being opened and closed by a back door 19 that is axially supported at an upper end of the back door opening 17. The back door 19 is capable of being opened and closed manually, and also capable of being opened and closed automatically by a non-illustrated movement mechanism. As illustrated in FIG. 3, the back door 19 is axially supported at an edge portion 17A at the upper side of the back door opening 17 so as to be capable of swinging about an axial direction running along a left-right direction. When the back door 19 swings toward the upper side (in the arrow A direction in FIG. 3), the back door opening 17 formed in the vehicle body 14 is opened up. When the back door 19 is moved toward the lower side (the opposite side to the arrow A direction in FIG. 3), the back door opening 17 is closed off, as illustrated in FIG. 1.

Note that in the first exemplary embodiment, the back door opening 17 corresponds to a first opening, and the side door opening 16 corresponds to a second opening.

A housing unit 20 in which the packages B are housed is provided inside the cabin 12. As illustrated in FIG. 1 to FIG. 3, the housing unit 20 is configured by plural shelves 22 extending along the vehicle front-rear direction and arrayed in a vehicle vertical direction inside the cabin 12. Each of the shelves 22 is formed such that a rear end thereof is disposed at the back door opening 17 side (at a rear end of the vehicle body 14), and a front end is positioned further toward the front side than a vehicle front-rear direction center of the side door opening 16 inside the cabin 12. Namely, the respective shelves 22 are installed with a uniform gap present between the front ends of the shelves 22 and the rear of a driving seat. The shelves 22 extend at an incline toward the vehicle lower side on progression from the rear ends to the front ends thereof, such that the front ends of the shelves 22 are positioned further toward the lower side of the vehicle 10 than the rear ends of the shelves 22. As an example, each of the shelves 22 is provided with plural rollers (not illustrated in the drawings) with rotation axes along the vehicle width direction. The packages B move along these plural rollers, thereby enabling the packages B to move smoothly over the shelves 22 under their own weight.

As illustrated in FIG. 1 to FIG. 3, the packages B are placed on upper faces of the shelves 22 in the housing unit 20. Stoppers 23 are provided at the front ends of the shelves 22 to prevent the packages B from falling off. As an example, each of the stoppers 23 is axially supported so as to be capable of rotating about an upright shaft provided on a side face of the corresponding shelf 22. When a predetermined force is applied to the stopper 23 in a direction toward a downstream side of the shelf 22, the stopper 23 rotates and the restriction on movement of the corresponding package B is thereby released. Namely, the package B is freed for unloading from the shelf 22. Note that some of the shelves 22 are omitted from illustration in FIG. 1 to FIG. 3. Moreover, although there appear to be gaps between adjacent packages B on an upstream side and downstream side of one another on the respective shelves 22 in the illustrations, in reality such gaps do not exist due to the packages B moving toward the downstream side under their own weight. The stoppers 23 are omitted from illustration in FIG. 1.

The vehicle 10 also includes a transfer unit 40 for transferring packages between the housing unit 20 and the side door opening 16. As illustrated in FIG. 1 and FIG. 2, the transfer unit 40 is configured by a belt conveyor 42 that supplies a package B unloaded from a shelf 22 to a delivery box D placed outside the cabin 12. The belt conveyor 42 extends along the vehicle width direction inside the cabin 12. The belt conveyor 42 is installed in a state that allows the sliding doors 18 to open and close. The package B that has been brought to a position adjacent to the delivery box D by the belt conveyor 42 is then stowed inside the delivery box D by a non-illustrated arm or the like. Note that illustration of the belt conveyor 42 has been simplified in FIG. 1 and FIG. 2. In reality, the belt conveyor 42 includes a structure in which a power unit rotates a broad endless rubber belt around a platform, and known technology is employed therefor.

Operation and Advantageous Effects of First Exemplary Embodiment

Next, explanation follows regarding operation and advantageous effects of the first exemplary embodiment.

As illustrated in FIG. 3, in the vehicle 10 of the first exemplary embodiment, the packages B are placed on board through the back door opening 17. Specifically, after the back door opening 17 has been placed in an open state by swinging the back door 19 upward, an operation is performed to place the packages B on board. When a worker places a package B on the upstream side of a shelf 22, namely on an upper face on the back door opening 17 side of the shelf 22, the package B moves toward the vehicle front side of the shelf 22 under its own weight. As illustrated in FIG. 2, the package B then abuts the corresponding stopper 23 and comes to a halt on the shelf 22. In this manner, the packages B to be delivered are housed on the shelves 22 in sequence. Note that the packages B are placed on board in the sequence in which they are to be delivered. This enables the packages B that will be delivered earlier to be housed at the downstream side, namely at the vehicle front side, of the shelves 22.

The worker is thereby able to house the packages B on the shelves 22 simply by placing the packages B on the upper faces at the upstream side of the shelves 22, thereby enabling an operation to place the packages B on board to be performed simply.

When the packages B to be delivered have been placed on board the vehicle 10 in the above manner, the vehicle travels toward a delivery destination. The vehicle 10 stops once it is close to the delivery destination. The sliding doors 18 are then opened as illustrated in FIG. 1 and FIG. 2, and the delivery box D is disposed below an end portion on the side door opening 16 side of the belt conveyor 42. Note that the delivery box D may be configured by a moving body with an automated mobility function, such as a mobile robot or a drone.

Next, the package B at the upstream side of the shelf 22 housing a package B to be delivered at the present delivery destination is pressed by a non-illustrated pressing mechanism so as to release the restriction on movement of the package B at the downstream side by the stopper 23. When this restriction on movement is released, the package B at the downstream side is freed, and unloaded onto the belt conveyor 42 from the shelf 22. The package B is unloaded onto the belt conveyor 42 from the shelf 22 by a non-illustrated arm or the like such that the contents of the package B are not damaged by shock or the like during this unloading. Note that known technology may be applied as the pressing mechanism, and so detailed explanation thereof is omitted.

When the package B has been unloaded onto the belt conveyor 42, the belt conveyor 42 is actuated by the power unit (not illustrated in the drawings), such that the package B is conveyed as far as the delivery box D before stopping, as illustrated in FIG. 1 and FIG. 2. The thus conveyed package B is then housed in the delivery box D by a non-illustrated arm or the like, and delivered to the delivery destination in the delivery box D.

As described above, the vehicle 10 of the first exemplary embodiment enables a package B to be moved from the back door opening 17 to the transfer unit 40 via the shelves 22 configuring the housing unit 20. This enables the package B to be moved as far as the transfer unit 40 without employing a belt conveyor requiring motive force, thereby enabling costs to be reduced. Moreover, a package B can be moved as far as the transfer unit 40 simply by loading the package B on at the upstream side (the back door opening 17 side) of the shelves 22 of the housing unit 20, such that worker operating efficiency is improved.

Moreover, the vehicle 10 of the first exemplary embodiment is provided with the back door opening 17 through which the packages B are loaded on, and the side door opening 16 through which the packages B are unloaded, thereby enabling the packages B to be placed on board from the vehicle rear, and enabling the packages B to be carried away from a side of the vehicle. This enables a pathway for loading on the packages B and a pathway for unloading the packages B to be separated, thereby improving operating efficiency.

Note that although the pressing mechanism (not illustrated in the drawings) is employed when unloading a package B onto the belt conveyor 42 from a shelf 22 in the first exemplary embodiment, there is no limitation thereto. For example, a package B at the downstream side of a shelf 22 whose movement has been restricted by the corresponding stopper 23 may be pulled out and unloaded by a non-illustrated arm. Moreover, in cases in which such an arm is capable of lifting the package B, the package B may be moved up and over the stopper 23. In such cases, the stoppers 23 do not need to be axially supported so as to be capable of rotating as described previously.

Although as illustrated in FIG. 2, each of the stoppers 23 is axially supported by the upright shaft on a side face of the corresponding shelf 22 in the first exemplary embodiment, there is no limitation thereto. Any structure capable of restricting movement of the packages B toward the downstream side may be applied for the stoppers 23, and known technology may be employed therefor.

Although the plural rollers (not illustrated in the drawings) with rotation axes along the vehicle width direction are provided at the shelves 22 in the first exemplary embodiment, the configuration of the shelves 22 is not limited thereto. For example, the shelves 22 themselves may be configured by rubber without providing rollers. In such cases, frictional force, the incline angle, and so on should be set such that the packages B are capable of moving toward the downstream side of the shelves 22 under their own weight. Note that the shelves 22 may be configured of any material, as long as the packages B are capable of moving toward the downstream side under their own weight.

Second Exemplary Embodiment

Figure 4:
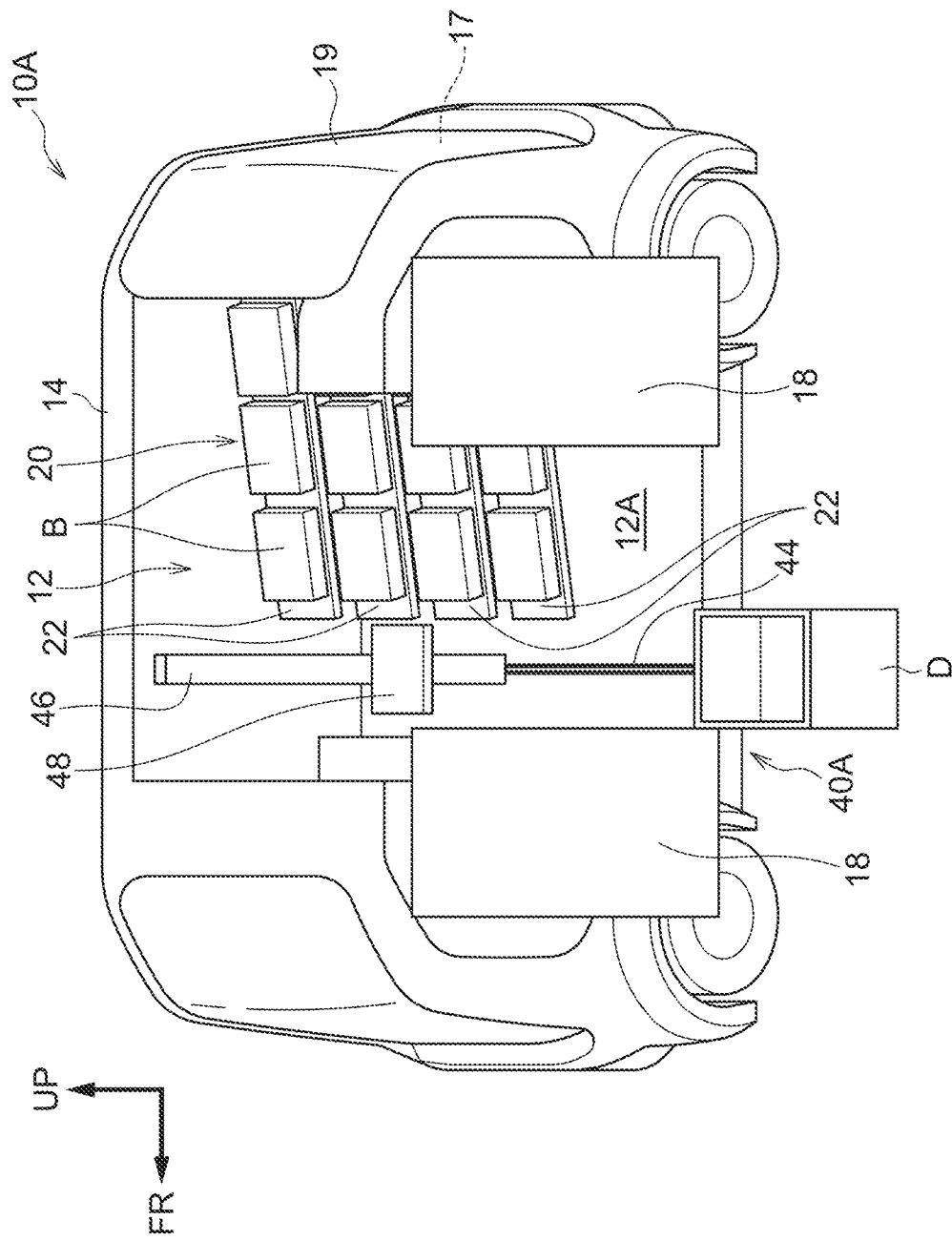
FIG. 4 is a perspective view illustrating a vehicle according to a second exemplary embodiment as viewed from the upper left side, with an upper side of the vehicle partially cut away.
Figure 5:
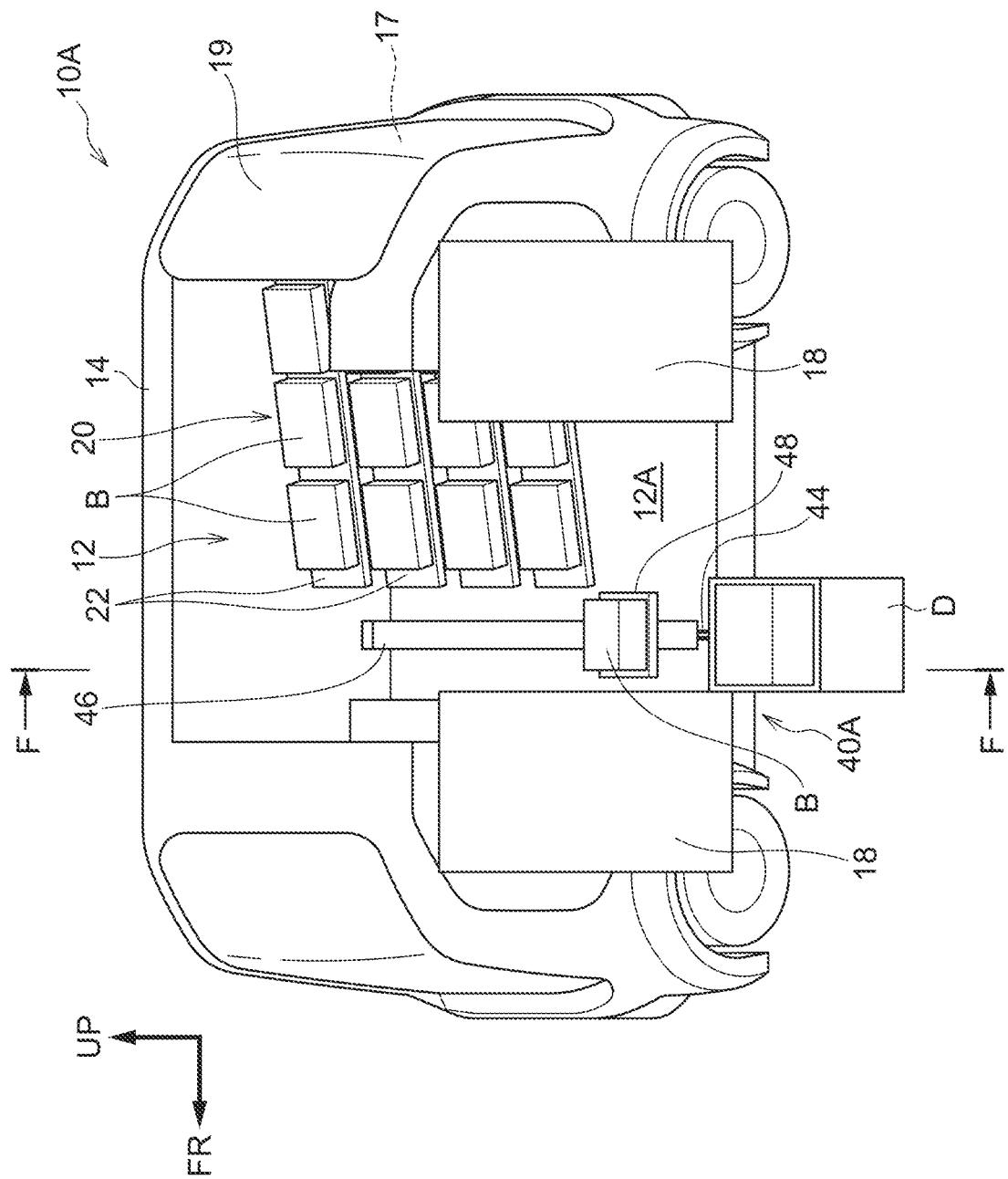
FIG. 5 is a perspective view illustrating a vehicle after operation of a transfer unit as viewed from the upper left side, with an upper side of the vehicle partially cut away.

Next, explanation follows regarding a vehicle 10A according to a second exemplary embodiment of the present disclosure, with reference to FIG. 4 to FIG. 6. Note that in the vehicle 10A of the second exemplary embodiment, configuration similar to that of the vehicle 10 of the first exemplary embodiment described above is allocated the same reference numerals and detailed explanation thereof is omitted, with detailed description being reserved only for points that differ.

Vehicle

FIG. 4 is a perspective view illustrating the vehicle 10A according to the second exemplary embodiment as viewed from an upper left side, with the upper side of the vehicle 10A partially cut away. Note that the vehicle 10A is a delivery vehicle for conveying packages B.

The vehicle 10A according to the second exemplary embodiment includes a transfer unit 40A that differs from the transfer unit 40 of the vehicle 10 of the first exemplary embodiment. The transfer unit 40A (illustrated in simplified form in FIG. 4 to FIG. 6) transfers packages B between the housing unit 20 and the side door opening 16. As illustrated in FIG. 4 to FIG. 6, the transfer unit 40A includes a rail 44 provided at a floor 12A inside the cabin 12 of the vehicle 10A, a support column 46 that is capable of moving along the rail 44, and a loading platform 48 that is capable of being raised and lowered along the support column 46 in the vertical direction.

The rail 44 extends across the floor 12A inside the cabin 12 in the vehicle width direction from the vicinity of a right side face of the vehicle body 14 to the vicinity of the side door opening 16. Both vehicle width direction end portions of the rail 44 are screwed down using attachment fittings (not illustrated in the drawings) so as to fasten the rail 44 to the floor 12A. A movement range of the support column 46, described later, is limited by the attachment fittings of the rail 44.

Mobility wheels (not illustrated in the drawings) that allow the support column 46 to move along the rail 44 are provided at a lower end face of the support column 46. The mobility wheels are configured by a pair of wheels. The pair of wheels are provided on either side of the rail 44. One of the wheels is driven by a non-illustrated first motor, and the other of the wheels is supported by the support column 46 so as to be capable of rotating freely. The support column 46 is capable of moving substantially horizontally along the rail 44 between a right end and a left end of the cabin 12 accompanying rotation of the mobility wheels.

The loading platform 48 is formed in a rectangular shape extending along a horizontal direction. The loading platform 48 is capable of being raised and lowered along the support column 46 on being driven by a non-illustrated second motor. The loading platform 48 is capable of being disposed at a position allowing a package B of a predetermined size housed on one of the shelves 22 inside the cabin 12 to be placed thereon.

Operation and Advantageous Effects of Second Exemplary Embodiment

Next, explanation follows regarding operation and advantageous effects of the second exemplary embodiment.

Similarly to in the first exemplary embodiment, when the packages B to be delivered have been placed on board the vehicle 10A, the vehicle travels toward a delivery destination. The vehicle 10A stops once it is close to the delivery destination. The sliding doors 18 are then opened as illustrated in FIG. 4 to FIG. 6, and the delivery box D is disposed in the vicinity of the side door opening 16.

Next, the loading platform 48 is moved to the position of the shelf 22 housing a package B to be delivered at the present delivery destination. Specifically, under commands from a non-illustrated control section, the first motor is driven to move the support column 46 in the vehicle width direction, and the second motor is driven to move the loading platform 48 in the vehicle vertical direction, such that the loading platform 48 is moved to the position of the target shelf 22 as illustrated in FIG. 4.

The package B at the upstream side of the shelf 22 where the loading platform 48 is positioned is then pressed by the non-illustrated pressing mechanism so as to release the restriction on movement of the package B at the downstream side by the stopper 23. When this restriction on movement is released, the package B at the downstream side is freed, and unloaded onto the loading platform 48 from the shelf 22. The package B is unloaded onto the loading platform 48 from the shelf 22 by a non-illustrated arm or the like such that the contents of the package B are not damaged by shock or the like during this unloading. Note that known technology may be applied as the pressing mechanism, and so detailed explanation thereof is omitted.

When the package B has been unloaded onto the loading platform 48, under a command from the non-illustrated control section, the first motor is driven to move the support column 46 along the vehicle width direction, such that the loading platform 48 on which the package B has been placed is conveyed as far as the delivery box D, as illustrated in FIG. 5 and FIG. 6. The thus conveyed package B is then housed in the delivery box D by a non-illustrated arm or the like, before being delivered to the delivery destination in the delivery box D. Note that prior to conveyance by such an arm, under a command from the non-illustrated control section, the second motor may be driven to move the loading platform 48 in the vehicle vertical direction, such that the loading platform 48 on which the package B has been placed is conveyed to a height in the vicinity of the delivery box D.

As described above, the vehicle 10A of the second exemplary embodiment enables a package B to be moved from the back door opening 17 to the transfer unit 40A via the shelves 22 configuring the housing unit 20. This enables the package B to be moved as far as the transfer unit 40A without employing a belt conveyor requiring motive force, thereby enabling costs to be reduced. Moreover, a package B can be moved as far as the transfer unit 40A simply by loading the package B on at the upstream side (the back door opening 17 side) of the shelves 22 of the housing unit 20, such that worker operating efficiency is improved.

Moreover, the vehicle 10A of the second exemplary embodiment is provided with the back door opening 17 through which the packages B are loaded on, and the side door opening 16 through which the packages B are unloaded, thereby enabling the packages B to be placed on board from the vehicle rear, and the packages B to be carried away from a side of the vehicle. This enables a pathway for loading on the packages B and a pathway for unloading the packages B to be separated, thereby improving operating efficiency.

Note that although the pressing mechanism (not illustrated in the drawings) is employed when unloading a package B onto the loading platform 48 from a shelf 22 in the second exemplary embodiment, there is no limitation thereto. For example, a package B at the downstream side of a shelf 22 whose movement has been restricted by the corresponding stopper 23 may be pulled out and unloaded by a non-illustrated arm. Moreover, in cases in which such an arm is capable of lifting the package B, the package B may be moved up and over the stopper 23. In such cases, the stoppers 23 do not need to be axially supported so as to be capable of rotating as described previously.

Third Exemplary Embodiment

Figure 7:
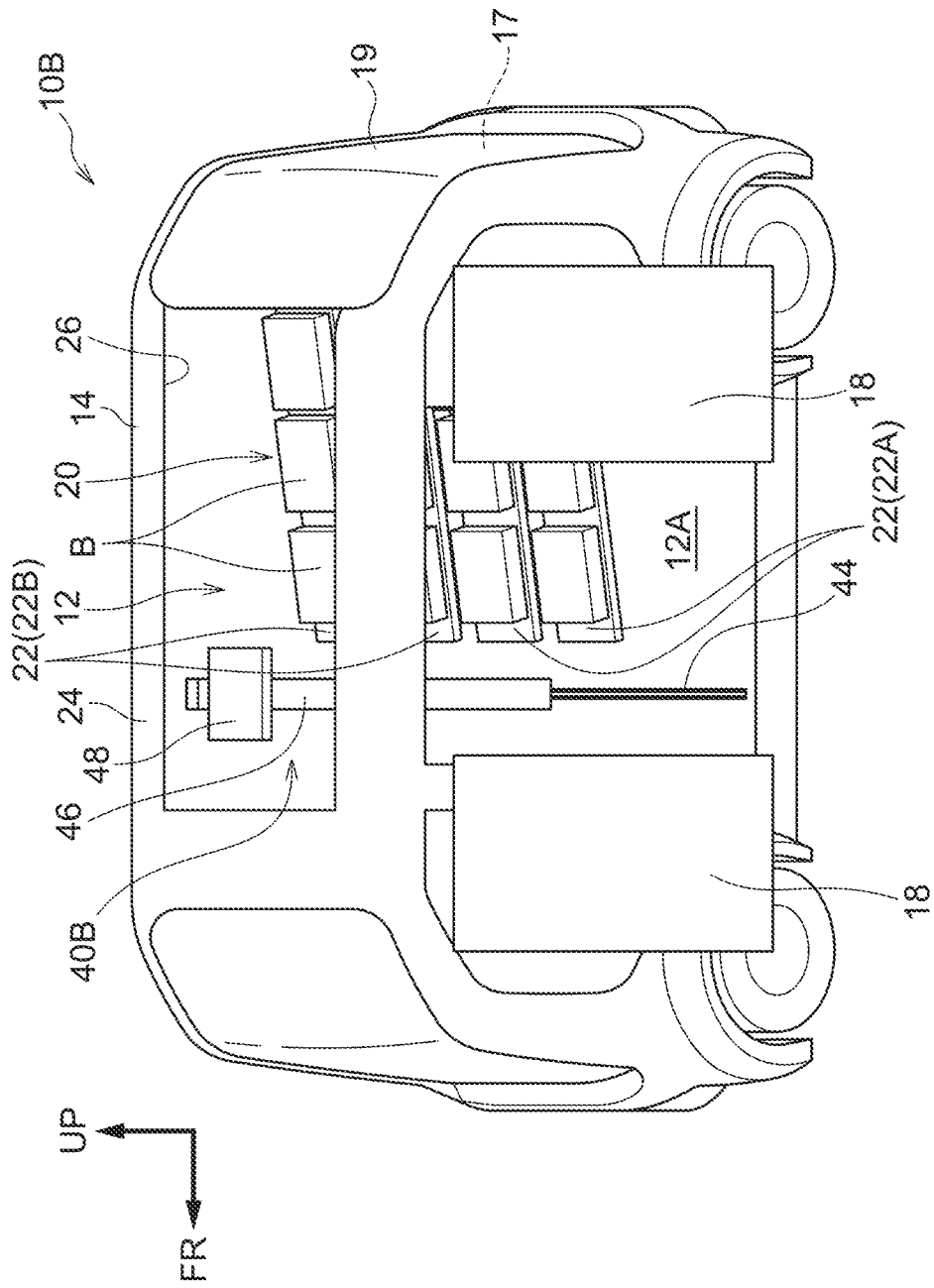
FIG. 7 is a perspective view illustrating a vehicle according to a third exemplary embodiment as viewed from the upper left side, with an upper side of the vehicle partially cut away.

Next, explanation follows regarding a vehicle 10B serving as a delivery vehicle according to a third exemplary embodiment of the present disclosure, with reference to FIG. 7. FIG. 7 is a perspective view illustrating the vehicle 10B according to the third exemplary embodiment as viewed from the upper left side, with an upper side of the vehicle 10B partially cut away. Note that in the vehicle 10B of the third exemplary embodiment, configuration similar to that of the vehicle 10A of the second exemplary embodiment described above is allocated the same reference numerals and detailed explanation thereof is omitted, with detailed description being reserved only for points that differ.

Vehicle

As illustrated in FIG. 7, in the vehicle 10B of the third exemplary embodiment, a ceiling opening 26 is formed in a roof section (also referred to as vehicle roof section) 24 configuring an upper face of the vehicle body 14. The ceiling opening 26 places the interior and exterior of the cabin 12 in communication with each other. A ceiling shutter (not illustrated in the drawings) is provided at the ceiling opening 26, and the ceiling opening 26 is capable of being automatically opened and closed by operation of a movement mechanism (not illustrated in the drawings). The ceiling shutter may for example have a structure that is raised and lowered to open and close the ceiling opening 26, a structure that slides horizontally along the vehicle front-rear direction to open and close the ceiling opening 26, or a structure that slides horizontally along the vehicle width direction to open and close the ceiling opening 26. Known technology may be applied as the ceiling shutter.

In the second exemplary embodiment, the side door opening 16 corresponds to a second opening, whereas in the third exemplary embodiment, the ceiling opening 26 corresponds to a second opening. A transfer unit 40B of the third exemplary embodiment has the same structure as the transfer unit 40A of the second exemplary embodiment, and so detailed explanation thereof is omitted. In the vehicle 10B of the third exemplary embodiment, the ceiling opening 26 enables packages B to be passed in and out (conveyed) between the interior of the cabin 12 and a space above the roof section 24.

Operation and Advantageous Effects of Third Exemplary Embodiment

Next, explanation follows regarding operation and advantageous effects of the third exemplary embodiment.

Similarly to in the first exemplary embodiment, when the packages B to be delivered have been placed on board the vehicle 10B, the vehicle travels toward its delivery destination. The vehicle 10B stops once it is close to the delivery destination. The ceiling shutter (not illustrated in the drawings) is then opened so as to open up the ceiling opening 26 as illustrated in FIG. 7.

Next, the loading platform 48 is moved to the position of the shelf 22 housing a package B to be delivered at the present delivery destination. Specifically, under commands from the non-illustrated control section, the first motor is driven to move the support column 46 in the vehicle width direction, and the second motor is driven to move the loading platform 48 in the vehicle vertical direction, such that the loading platform 48 is moved to the position of the target shelf 22 (see FIG. 4).

The package B at the upstream side of the shelf 22 where the loading platform 48 is positioned is then pressed by the non-illustrated pressing mechanism so as to release the restriction on movement of the package B at the downstream side by the stopper 23. When this restriction on movement is released, the package B at the downstream side is freed, and unloaded onto the loading platform 48 from the shelf 22. The package B is unloaded onto the loading platform 48 from the shelf 22 by a non-illustrated arm or the like such that the contents of the package B are not damaged by shock or the like during this unloading.

When the package B has been unloaded onto the loading platform 48, under a command from the non-illustrated control section, the first motor is driven to move the support column 46 along the vehicle width direction, such that the loading platform 48 on which the package B has been placed is conveyed as far as a position directly below the ceiling opening 26 as illustrated in FIG. 7. Under a further command from the non-illustrated control section, the second motor is driven to move the loading platform 48 in the vehicle upward direction, such that the loading platform 48 on which the package B has been placed is conveyed as far as a height in the vicinity of the ceiling opening 26.

The package B that has been conveyed together with the loading platform 48 as far as a height in the vicinity of the ceiling opening 26 is then grasped by a drone through the ceiling opening 26 and delivered to its delivery destination.

As described above, in the vehicle 10B of the third exemplary embodiment, the ceiling opening 26 is provided in the roof section 24 of the vehicle body 14, thereby enabling a package B to be transferred through the ceiling opening 26 in the roof section 24 in cases in which, for example, a drone is employed to perform deliveries, thereby improving operating efficiency.

Note that although packages B are passed in and out (conveyed) through the ceiling opening 26 only in the third exemplary embodiment, there is no limitation thereto. Explanation follows regarding a modified example of the third exemplary embodiment.

Modified Example of Third Exemplary Embodiment

In this modified example, in addition to the configuration of the third exemplary embodiment, packages B may also be passed in and out through the side door opening 16 as in the second exemplary embodiment. In such a case, since packages B are passed in and out through both the ceiling opening 26 and the side door opening 16, the side door opening 16 corresponds to a second opening, and the ceiling opening 26 corresponds to a third opening.

In cases in which packages B are passed in and out through both the ceiling opening 26 and the side door opening 16, the following format may be adopted. Namely, in a case in which, for example, the shelves 22 are arrayed in four rows in the vehicle width direction as illustrated in FIG. 7, packages B on the shelves 22A forming the two rows on the side door opening 16 side may be unloaded through the side door opening 16 (see the second exemplary embodiment), whereas packages B on the shelves 22B forming the two rows on the opposite side to the side door opening 16 may be unloaded through the ceiling opening 26 (see the third exemplary embodiment). In such cases, for example, two of the support columns 46 that move along the rail 44 and two of the loading platforms 48 may be provided, with one of these units being employed to unload packages B through the side door opening 16 and the other of these units being employed to unload packages B through the ceiling opening 26.

Operation and Advantageous Effects of Modified Example of Third Exemplary Embodiment As described above, in the vehicle 10B according to the modified example of the third exemplary embodiment, the ceiling opening 26 is provided at a different position from both the back door opening 17 and the side door opening 16. By increasing the number of conveyance pathways for the packages B in this manner, worker operating efficiency is further improved.

Moreover, in the vehicle 10B according to the modified example of the third exemplary embodiment, the transfer unit 40B is able to transfer packages B between the housing unit 20 and the side door opening 16, and also between the housing unit 20 and the ceiling opening 26. Since there are two pathways for unloading the packages B, the operating efficiency when unloading the packages B is improved.

Fourth Exemplary Embodiment

Next, explanation follows regarding a vehicle 10C serving as a delivery vehicle according to a fourth exemplary embodiment of the present disclosure, with reference to FIG. 8. FIG. 8 is a cross-section perspective view illustrating the vehicle 10C according to the fourth exemplary embodiment as viewed from the front left side, with an upper side of the vehicle 10C partially cut away. Note that in the vehicle 10C of the fourth exemplary embodiment, configuration similar to that of the vehicle 10B of the third exemplary embodiment and the modified example of the third exemplary embodiment described above is allocated the same reference numerals and detailed explanation thereof is omitted, with detailed description being reserved only for points that differ.

As illustrated in FIG. 8, in the vehicle 10C of the fourth exemplary embodiment, a ceiling opening 26C is formed in the roof section (also referred to as vehicle roof section) 24 configuring the upper face of the vehicle body 14. The ceiling opening 26C places the interior and exterior of the cabin 12 in communication with each other. The ceiling opening 26C of the fourth exemplary embodiment is configured by a single opening that extends from above the loading platform 48 as far as above an upstream side end portion of the shelves 22. A ceiling shutter (not illustrated in the drawings) similar to that in the third exemplary embodiment is provided at the ceiling opening 26C.

As illustrated in FIG. 8, the vehicle 10C includes a cargo handling section 50 that conveys packages B through the ceiling opening 26C to the upstream side of the shelves 22 configuring the housing unit 20. The cargo handling section 50 may for example be a drone (not illustrated in the drawings), or a combination of a front-rear direction-movable bar (not illustrated in the drawings) that moves along the vehicle front-rear direction above the roof section 24 and a vehicle width direction-movable bar (not illustrated in the drawings) that moves along the vehicle width direction above the roof section 24. In the latter case, a package B on the loading platform 48 is moved to an upper face of the roof section 24 by a non-illustrated arm or the like, after which the front-rear direction-movable bar and the vehicle width direction-movable bar are moved by drive devices (not illustrated in the drawings) to move the package B to the upstream side of a target shelf 22.

Note that although the ceiling opening 26 of the fourth exemplary embodiment is configured by a single opening, there is no limitation thereto. For example, a configuration in which two openings are provided may be applied as long as the openings are formed at least above the loading platform 48 and above the upstream side end portion of the shelves 22, and these openings are larger than the packages B.

Operation and Advantageous Effects of Fourth Exemplary Embodiment

The vehicle 10C according to the fourth exemplary embodiment is provided with the cargo handling section 50 to carry packages B through the ceiling opening 26C to the upstream side of the shelves 22 configuring the housing unit 20, thereby enabling a package B that has been extracted through the ceiling opening 26C provided in the roof section 24 of the vehicle 10C to be housed in the housing unit 20 by the cargo handling section 50. This for example enables an operation to be performed to rearrange the packages B housed in the housing unit 20 according to the delivery destination.

Although the sliding doors 18 are employed as doors that open and close the side door opening 16 in the above exemplary embodiments, there is no limitation thereto. A hinged door may be employed instead.

Although the side door opening 16 is provided at a left side face of the vehicle body 14 in the above exemplary embodiments, there is no limitation thereto. The side door opening 16 may be provided at a right side face of the vehicle body 14, or may be provided at both the left side face and the right side face of the vehicle body 14.

Although examples have been described above, the present disclosure is not limited to the above description, and obviously various other modifications may be implemented within a range not departing from the spirit of the present disclosure.

What is claimed is:

1. A delivery vehicle, comprising:
   a vehicle body;
   a first opening that is provided at the vehicle body and that places a cabin interior and a cabin exterior in communication with each other, wherein the first opening is provided at a rear end section of the vehicle body;
   a second opening that is provided at the vehicle body at a different position from the first opening, and that places the cabin interior and the cabin exterior in communication with each other, wherein the second opening is provided on at least one of two side sections of the vehicle body;
   a housing unit that is configured to accommodate a package in the cabin interior, that has one end disposed at a side corresponding to the first opening, and that has another end positioned further toward a vehicle lower side than the one end such that the housing unit is inclined in a vehicle downward direction from the one end toward the other end; and
   a transfer unit configured to transfer the package between the housing unit and the second opening, wherein the transfer unit includes:
   a rail provided at a floor of the cabin interior, wherein the rail extends in a vehicle width direction,
   a support column capable of moving along the rail, and
   a loading platform capable of being raised and lowered along the support column in a vertical direction;
   a third opening that is provided at the vehicle body at a different position from the first opening and the second opening, and that places the cabin interior and the cabin exterior in communication with each other, wherein the third opening is provided at a roof section of the vehicle body; and
   a cargo handling section configured to carry the package from the third opening to the one end side of the housing unit.

2. The delivery vehicle of claim 1, wherein the transfer unit is further configured to transfer the package between the housing unit and the third opening.

3. The delivery vehicle of claim 1, wherein the cargo handling section comprises a drone.

4. The delivery vehicle of claim 1, wherein the cargo handling section comprise:
   a combination of a front-rear direction movable bar that moves along the vehicle front-rear direction above the roof section; and
   a vehicle width direction movable bar that moves along the vehicle width direction above the roof section.

* * * * *